United States Patent
Schuiten

(10) Patent No.: US 10,464,821 B2
(45) Date of Patent: Nov. 5, 2019

(54) SYSTEM AND METHOD FOR CLEANING AND STERILIZING A WATER FLOW

(71) Applicant: B.V. SCHEEPSWERF DAMEN GORINCHEM, Gorinchem (NL)

(72) Inventor: Matthijs Schuiten, Dordrecht (NL)

(73) Assignee: B.V. SCHEEPSWERF DAMEN GORINCHEM, Gorincham (NL)

( * ) Notice: Subject to any disclaimer, the term of this patent is extended or adjusted under 35 U.S.C. 154(b) by 120 days.

(21) Appl. No.: 15/312,576

(22) PCT Filed: May 21, 2015

(86) PCT No.: PCT/EP2015/061260
§ 371 (c)(1),
(2) Date: Nov. 18, 2016

(87) PCT Pub. No.: WO2015/177280
PCT Pub. Date: Nov. 26, 2015

(65) Prior Publication Data
US 2017/0088435 A1    Mar. 30, 2017

(30) Foreign Application Priority Data

May 21, 2014 (EP) .................................. 14169245
Dec. 4, 2014 (EP) .................................. 14196254

(51) Int. Cl.
*C02F 1/00* (2006.01)
*B63J 4/00* (2006.01)
(Continued)

(52) U.S. Cl.
CPC .............. *C02F 1/004* (2013.01); *B01D 33/06* (2013.01); *B01D 33/11* (2013.01); *B01D 33/463* (2013.01);
(Continued)

(58) Field of Classification Search
None
See application file for complete search history.

(56) References Cited

U.S. PATENT DOCUMENTS 6,125,481 A * 10/2000 Sicilano ................. C02F 1/008
                                                  210/143
2010/0044309 A1 * 2/2010 Lee ..................... B01D 46/0041
                                                  210/636
(Continued)

FOREIGN PATENT DOCUMENTS

CN      102316952 A    1/2012
GB      1497866        1/1978
(Continued)

OTHER PUBLICATIONS

Chilean Office Action for Chilean Patent Application No. 201602978, dated Jun. 12, 2018, with English translation.
(Continued)

*Primary Examiner* — Richard C Gurtowski
(74) *Attorney, Agent, or Firm* — Steven M. Koehler; Westman, Champlin & Koehler, P.A.

(57) ABSTRACT

A system for cleaning and sterilizing a water flow comprises a main treatment line with a pump to pump water from a water storage, a main filter, a sterilizing station and a system outlet. The main filter is provided with a first filter element and a backflush member to rinse the first filter element with backflush water. The secondary treatment line connects to an outlet of the backflush member, and has a backflush filter to remove silt from the backflush water. The main filter is designed such that the pressure difference over the first filter element is at least 0.1 bar (10 kPa) and the backflush filter is designed such that the pressure difference over the backflush filter element is less than 0.05 bar (5 kPa).

19 Claims, 4 Drawing Sheets

(51) Int. Cl.
*C02F 1/38* (2006.01)
*B01D 33/11* (2006.01)
*B01D 33/46* (2006.01)
*B01D 33/50* (2006.01)
*B01D 33/06* (2006.01)
*B01D 35/02* (2006.01)
*C02F 1/32* (2006.01)
*C02F 103/00* (2006.01)

(52) U.S. Cl.
CPC .......... *B01D 33/503* (2013.01); *B01D 35/02* (2013.01); *B63J 4/002* (2013.01); *C02F 1/325* (2013.01); *C02F 1/38* (2013.01); *C02F 1/32* (2013.01); *C02F 2103/008* (2013.01); *C02F 2201/001* (2013.01); *C02F 2203/008* (2013.01); *C02F 2209/03* (2013.01); *C02F 2209/42* (2013.01); *C02F 2301/08* (2013.01); *C02F 2303/04* (2013.01); *C02F 2303/16* (2013.01); *C02F 2303/20* (2013.01)

(56) References Cited

U.S. PATENT DOCUMENTS

| | | | | |
|---|---|---|---|---|
| 2012/0325753 A1* | 12/2012 | Baker | .................... | B01D 33/11 210/744 |
| 2014/0021137 A1* | 1/2014 | Smiddy | .................. | C02F 9/005 210/663 |
| 2014/0319075 A1 | 10/2014 | Sogaard | | |
| 2015/0027960 A1 | 1/2015 | Hosler et al. | | |
| 2015/0108071 A1 | 4/2015 | Kalhoj et al. | | |
| 2015/0174509 A1* | 6/2015 | Swaminathan | ........ | B01D 29/01 210/767 |
| 2015/0183663 A1 | 7/2015 | Kuik et al. | | |

FOREIGN PATENT DOCUMENTS

| | | |
|---|---|---|
| JP | 2008-507391 A | 3/2008 |
| RU | 2439000 C2 | 1/2012 |
| RU | 113264 U1 | 2/2012 |
| WO | 2005061388 A1 | 7/2005 |
| WO | 2006008729 A1 | 1/2006 |
| WO | 2013027125 A2 | 2/2013 |
| WO | 2013070085 A1 | 5/2013 |
| WO | 2013072476 A1 | 5/2013 |
| WO | 2013178296 A1 | 12/2013 |
| WO | 2014035343 A1 | 3/2014 |
| WO | 2014048416 A1 | 4/2014 |

OTHER PUBLICATIONS

International Search Report and Written Opinion for International patent application No. PCT/EP2015/061260, dated Oct. 14, 2015.
Russian Office Action, dated Dec. 13, 2018 for corresponding Russian Patent Application No. 2016147002/05(075427), filed May 21, 2015.
Notice of Reasons for Rejection for Japanese Patent Application No. 2016-568850, dated Apr. 1, 2019.

* cited by examiner

SYSTEM AND METHOD FOR CLEANING AND STERILIZING A WATER FLOW

CROSS-REFERENCE TO RELATED PATENT APPLICATION

The present application is a national phase of and claims priority of international patent application Serial No PCT/EP2015/061260, filed May 21, 2015, and published in English the content of which is hereby incorporated by reference in its entirety.

BACKGROUND

The present invention relates to a system for cleaning and sterilizing a water flow. The present invention further relates to a method for cleaning and sterilizing the water flow. The system is used for cleaning water flowing from ballast tanks of a ship into the environment when the outflow of water must fulfil the requirements that are specified in the International Maritime Organisation (IMO) ballast water convention. According to this convention in the cleaned water flowing from the vessel the maximum number of organisms greater than 50 micron is 10 organisms per cubic meter, for organisms between 10 and 50 micron the maximum number is 10 organism per milliliter and the convention specifies maximum concentrations of viable microbes that are harmful for health.

SUMMARY

The Summary and the Abstract herein are provided to introduce, a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

The invention provides for an improved system whereby floating organisms are removed from the water flow.

In an aspect of the invention a system for cleaning and sterilizing a water flow is proposed, the system comprising a main treatment line, comprising an inlet with a pump to pump water from a water storage, such as a ballast water tank of a vessel, through a main filter to a sterilizing station with one or more UV lamps to sterilize the water flow, and a system outlet. The main filter is provided with first filter element and a backflush member with a first backflush outlet to rinse the first filter element with backflush water.

The system further comprises a secondary treatment line, comprising an inlet being in fluid communication to the first backflush outlet, a backflush filter with a backflush filter element that has filter openings with a largest dimension between 50 micrometer and 20 micrometer to remove floating organisms or silt from the backflush water, and a secondary outlet being in fluid communication with the main treatment line, to lead filtered backflush water from the secondary treatment line to the main treatment line, wherein the backflush filter is designed such that a backflush pressure difference over the backflush filter element is less than 0.05 bar (5 kPa), and wherein the main filter is designed such that the pressure difference over the first filter element is at least 0.1 bar (10 kPa) or 0.2 bar (20 kPa) and wherein the largest dimension of openings in the first filter element preferably are smaller than half or one third of the largest dimension of the openings in the backflush filter element.

An advantage of the system is that the pressure drop over the openings of the first filter element is at least double the pressure drop over the backflush filter element. This leads to fragmentation of the organisms or inorganic parts that are pressed against the first filter element and through the openings. An organism or inorganic part that is larger than the openings in the first filter element will press against several openings in the filter and as the organism or inorganic part has no structural strength, parts of the organism or inorganic part will be pulled into several separate small pieces or fragments, which shall flow through the filter openings.

In this way, organism or inorganic parts will be fragmented into smaller parts and the fragmented parts often will be no longer viable or the fragments are easy accessible for UV radiation which causes killing the remaining viable parts of the organisms in the sterilizing station. In this way, the first filter element is used as a cutting or fragmenting device. Organisms or parts thereof and inorganic parts that contain structuring tissues such as a skeleton, bones, cartilage, shells or similar might not be fragmented and the organisms will get stuck against the first filter element and at a later stage will be rinsed from the first filter element by the backflush water and if it is larger than the openings in the backflush filter it will remain as silt on the backflush filter. The limited pressure difference over the backflush filter prevents deformation of the larger organisms against the backflush filter element so that these organisms are filtered from the water flow and only small organisms will flow into the sanitizing station where they are killed by the UV radiation.

A further effect caused by the fragmentation of the organisms and inorganic matter is, that a large part of and in a specific situation approximately 70 percent of the floating organisms that would be filtered out by the backflush filters now flushes as fragments through the smaller openings of first filter element with the main water flow and will not finish against the backflush filter element and in the silt. This reduction of the amount of silt in a specific water flow depends on the nature of the organisms in the water flow: the material ending in the silt that remains after a number of young shrimps are filtered from the water flow differs considerably from the material ending in the silt of zooplankton. Tests have shown that on average the fragmentation in the main filter reduces the weight per cubic meter of the silt that remains in the backflush filter with approximately 70% and reduces the dimensions of the organisms flushed through the main filter, so that killing these organisms with UV radiation is easier and requires less power.

In an embodiment, the backflush filter has a filter rinsing system to rinse the silt from the backflush filter with rinsing water and the filter rinsing system is connected to a separator or centrifuge to remove rinsing water from the silt. In this way, the silt that is rinsed from the backflush filter(s), is concentrated to a sediment with a water content of less than 20%. As the volume of the dewatered silt or sediment is small it can be stored separately and/or temporarily so that the system does not need a large storage for the removed silt. Removing the dewatered silt from the fluid circulating through the main and backflush filters prevents choking of the filters. After the separator or centrifuge, the water removed from the silt is re-circulated upstream to the main filter or backflush filter, so that silt remaining in the fluid, does not leave with the main flow but is fragmented or filtered out again. The dewatered silt or sediment is routed to outside the system and can be removed continuously or intermittently.

In an embodiment, the main filter comprises a first filter element with filter openings with a largest dimension of 10 micron or 6 micron. In this way, the organisms are reduced to small fragments before they may pass through the openings in the main filter, so that killing the fragments with UV radiation requires limited doses of radiation, and this makes the UV radiation more effective.

In an embodiment, the backflush member may be configured to rinse less than 20% or less than 10% of the first filter openings of the first filter elements simultaneously. The backflush member may be operated on basis of a pressure build-up measured within the main filter, such that when a pressure difference over the main filter exceeds a predetermined value, for example 0.3 bar (30 kPa), the backflush member is activated to rinse organisms or inorganic parts out of the main filter. The backflush member may configured to rinse a small or limited area of filter openings of the main filter, therewith minimising the flow of backflush water, which limits the dimensions of the backflush filter. The backflush member is provided with a drive to move over all first filter openings, so that by moving in due time all filter openings are cleaned while the filter openings not covered by the backflush member remain active as filter.

In accordance with an embodiment, the secondary treatment line might comprise two or more backflush filters in line and one of the backflush filters might have openings with a largest dimension of 25 micron or 20 micron. In this way, there is no risk that too large organisms leave the system with the water flow if a backflush filter fails. Further the maximum dimension of the openings in the backflush filter element of 25 or 20 micron ensures that the number of larger organisms that flow through openings in the backflush filter is reduced. This makes it easier to adhere to the limits specified in the IMO convention.

In a further embodiment, the first backflush filter in line might have filters openings with a largest dimension that is greater than or equal to the following backflush filter (s). In this way, the backflush filters remove particles of diminishing dimensions, whereby the silt to is spread over the various filters.

In an embodiment, at least one of the backflush filter(s) comprises a rotary drum filter. Such a rotary drum filter is advantageous since it is provides a reliable filtering of the water from which the floating organisms have to be removed. Further, the pressure difference over such a rotary drum filter can be small as the rotary drum filter can have a large filter surface.

In an embodiment, the secondary outlet is connected to the main treatment line upstream relative to the sterilizing station or wherein the secondary treatment line has a second sterilizing station. In this way, all water that leaves the system is subjected to UV radiation, so that there are no contagious organisms flowing from the system.

In an embodiment at least one of the UV-lamps in the sterilizing station is switched on continuously, which might be at a lower than full power. In this way, it is possible to start the system immediately, even with slow starting UV lamps, and flow out of water that is not irradiated is prevented.

In an embodiment, the backflush filter comprises a filter rinsing system to rinse the silt, from the backflush filter element with rinsing water, wherein an outlet of the filter rinsing system is connected co a silt tank to collect the rinsing water with the silt rinsed from the backflush filter, wherein the silt tank is connected to a separator, in particular a centrifuge, to dewater the silt, and wherein a first separator outlet is connected to the main treatment line or the secondary treatment line and a second separator outlet is connected to a storage area or to a storage tank to store the dewatered silt.

An advantage of this embodiment is that the sediment from the separator, in particular the centrifuge, is routed to outside the system, such that the sediment may be transported away from the system. The sediment may have a water content of less than 20% or about 7-15% and may be called slurry also. The slurry can be removed intermittently after treating ballast water from one or several ships.

Another advantage of this embodiment is that the backflush filter(s), are cleaned without stopping the water flow and/or without providing access to the filter device itself. In other words, the system may be a closed system and no access is required to clean the filter devices.

In an embodiment, the main treatment line comprises a self-priming unit and/or a straining unit upstream with respect to the main filter. When for instance the system for cleaning and sterilizing a water flow is a separate unit that can be connected to a ballast tank of a vessel, of the system can operate independently from the vessel.

The straining unit is provided for removing larger hard objects from the water flow in order to prevent that any damage is caused to, e.g. the main filter. The straining unit may be designed to remove particles larger than 4, or larger than 2 millimeter from the water flow.

In an embodiment, the main treatment line may comprise a pressure regulating element, in particular a flow control valve, to regulate the pressure at the downstream side of the first filter element. In this way it is possible to control the flow backflush water through the first filter element to ensure sufficient cleaning of the first filter element.

In an embodiment, the system for cleaning and sterilizing a water flow is placed in a container, which might be a moveable container and/or a on a vehicle, such as a truck, and/or on a vessel, such as a barge. In this way, the system can be brought to a ship that enters a harbor and needs to unload ballast water. In embodiments where the system is located in a sea going vessel, it might be part of the ship and it might be used when removing ballast water in all situations and harbors where the ship is. For semi-submersible ships the water flow to and/or from the ballast tanks might be cleaned and sterilized using the system or the system might be used to clean and sterilize washing water that is used for cleaning the ballast tanks. Placing the system in a container makes it possible to place the system in a closed environment, such that the system is not easily accessible or is only accessible by a selected group of persons, for example certified persons. Further, the system is easily transportable since the container may be placed on a transporting vehicle or vessel.

In an embodiment, the system for removing cleaning and sterilizing a water flow is provided with a power supply. The power supply may be placed within the container. When the system and the power supply are placed within a container, it might be advantageous to provide an air controlling device within the container. A system with an own power supply is an independently operating system and is thus able to operate at any desired location.

In an embodiment all vent valves upstream of the sterilizing station are connected so a tank that drains upstream of the sterilizing station. In this way no viable organisms such as microbes are released into the environment.

In an aspect, the invention comprises a method for cleaning and sterilizing a water flow, wherein the water flow is pumped through a first filter element of a main filter under a first pressure difference of at least 0.1 bar (10 kPa) or 0.2 bar (or 20 kPa). The first filter element is rinsed with a flow of backflush water and the organisms in the backflush water are filtered out in a backflush filter with openings with a largest dimension between 50 micrometer and 20 micrometer. Further, when a backflush pressure difference over the backflush filter element is more than 0.05 bar (5 kPa), the backflush filter is cleaned with a water spray and the water spray with silt is dewatered in a separator and the silt is stored for later disposal.

The water flowing from the main filter and the backflush filter is sterilized in a sterilizing station using UV radiation and guided to the environment, and the water flowing from the separator is re-entered into the system upstream of the main filter and/or the backflush filter. The advantage of this method is that the pressure difference over the first filter element causes the organisms pressed against the first filter element to fragment into smaller parts that can flow through the openings of the filter element. The smaller parts are easy to sanitize with UV radiation and the material flowing through the openings reduces the amount of dewatered silt that must be stored.

In an embodiment, the largest dimension of the openings in the first filter element is smaller than half of the largest dimensions of the openings in the backflush filter element or are smaller than 10 or 6 micrometer. In this way, the majority of the fragmented organisms entering the sanitizing station have a small dimension, which ensures that the UV radiation is most effective.

In an embodiment, the method comprises steps for measuring the first pressure difference over the first filter element, and, when the first pressure difference exceeds 0.3 bar (30 kPa) starting the flow of backflush water to rinse the first filter element. In the way, there will be no unnecessary back-flushing which reduces the load on the backflush filter.

In an embodiment the backflush filter is a rotary drum filter, the method may further comprise steps for measuring a water level within a drum of the rotary drum filter. When the water level reaches a predetermined level, the filter rinsing system is activated to remove silt from the inside surface of the drum.

BRIEF DESCRIPTION OF THE DRAWINGS

Aspects of the invention will be explained in greater detail by reference to exemplary embodiments of the invention shown in the drawings, in which.

DETAILED DESCRIPTION OF ILLUSTRATIVE EMBODIMENTS

It should be appreciated, however, that these embodiments may not be construed as limiting the scope of protection for the present invention.

Vessels travelling over the seas usually have ballast tanks in order to trim the vessel in dependence of the load situation. Ballast water is pumped from the surrounding water into the ballast tanks when, e.g., a vessel is not loaded with cargo, or water is pumped from the ballast tanks to the surrounding water when, e.g., the vessel is heavily loaded with cargo. The intake and outlet of the ballast water may occur at different locations and in different harbors, which may lead to undesired spreading of organisms now living only at specific locations of the world. The described system cleans and sanitizes a water flow and the system might be used to clean ballast water pumped from ballast tanks of a vessel.

In an embodiment the system may also be used to clean a water flow into a storage tank whereby the water stored in the storage tank might be used to rinse the ballast tank of for instance, a semi-submersible, ship so that this ship may use his ballast tanks during loading/unloading of cargo. Other embodiments where the system is used for other application for cleaning and sanitizing a water flow are also possible, these embodiments more or less use the same components as the embodiment described with the aid of the figures.

Figure 1:
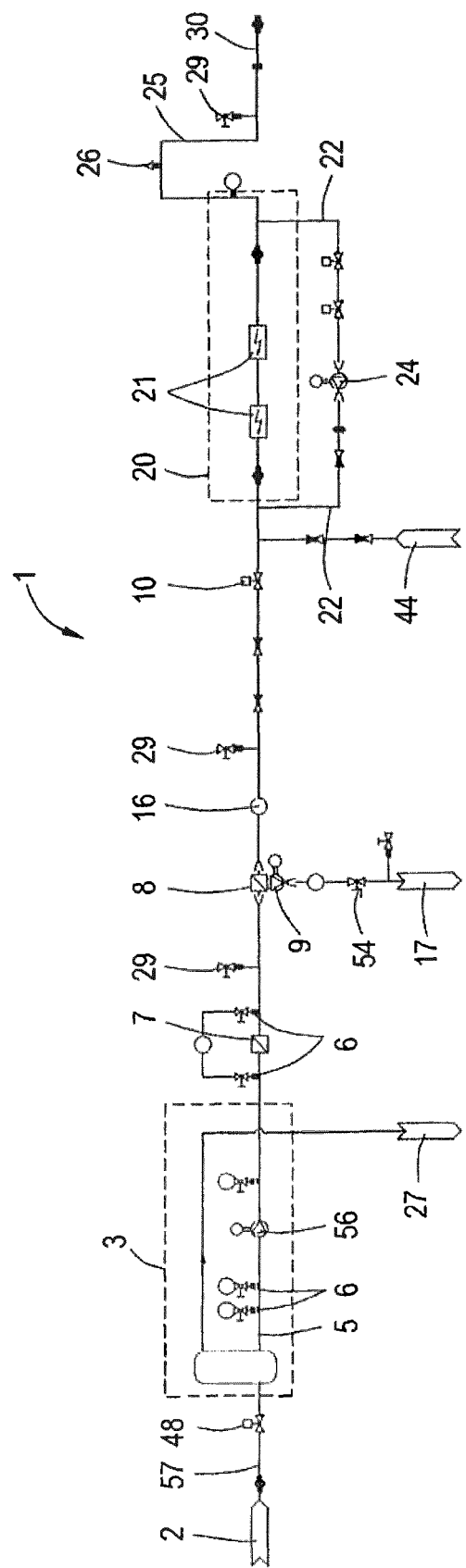
FIG. 1 is a schematic view of the main treatment line.

As shown in FIG. 1, a main treatment line 1 of a system for cleaning and sterilizing a water flow comprises an inlet 2 to connect with an outlet of a ballast tank or ballast tanks of a vessel (not shown). A self-priming unit 3 with a pump 56 is provided downstream to the inlet 2, such that it is possible to pump ballast water from the ballast tank(s) of the vessel into the main treatment line 1 even when the vessel is not able to pump ballast water from the ballast tank (s) to the system by itself.

The main treatment line 1 comprises conduits and appendages made of materials comprising ceramic, Fe, CuNi, plastic, etc. and/or a combination thereof, in order to prevent corrosion and undesired growth of organisms.

The self-priming unit 3 removes, if required, air from a line 57, which in this case is the line between the self-priming unit and the ballast tank(s) of the vessel, such that the pump 56 eventually pumps water from the ballast tank(s) into the system. In the case that the vessel uses a pump to pump water from the ballast tank(s) into the main treatment line 1, the self-priming unit functions as an additional pump or the pump 56 remains idle.

The pressure in a suction line 5 is determined by means of one or more pressure sensors 6 and when this pressure is above a specified limit, for example 1.1 bar (110 kPa), for a predetermined time period, for example 60 seconds, a bypass (not shown) might be opened and the water flow bypasses the self-priming unit.

A straining unit 7 is provided downstream to the self-priming unit. The straining unit 7 filters solids from the water that have entered the main treatment line 1. Solids, such as screws, scrap or other objects, may cause damage to parts of the system and therefore have to be removed from the water. The straining unit 7 may have openings with a maximum dimension of 4 or 2 mm. It is noted that in other embodiments of the system the straining unit may be positioned upstream to the self-priming unit 3 or may be positioned upstream to the outlet of the ballast tank(s) of the vessel (not shown).

Upstream and downstream to the straining unit 7, a pressure sensor 6 may be provided. It is possible to determine a pressure difference over the straining unit 7, which pressure difference for example may indicate that the straining unit 7 is obstructed by an object (not shown) and that urgent action is required.

Figure 3:
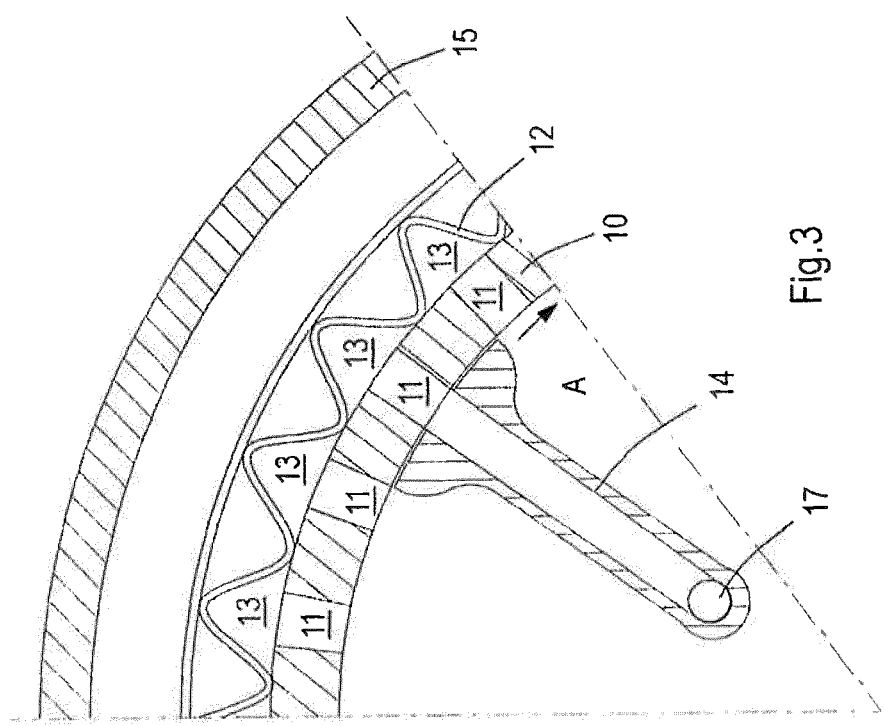
FIG. 3 is a partly cross-section of the main filter.

In the embodiment shown in FIG. 1, a main filter 8 is provided downstream to the straining unit 7. The main filter 8 comprises a housing 15 with an inlet and an outlet (not shown). As can be seen in FIG. 3, the main filter 8 comprises an annular element 10 with a plurality of openings 11. Around the annular element 10 a corrugated first filter element 12 is provided, such that after a row of openings 11 in the annular element 10 a filter chamber 13 is formed. Within the annular element 10, a backflush member with a backflush arm 14 is provided which seals against the annular element 10 and extends over at least a width equally to the distance between the openings 11. At the end of the backflush arm 14, which is near the annular element 10 a small tolerance between the end and the annular element 10 is provided to reduce the amount of water that enters the backflush arm 14 from within the annular element 10. Alternatively, seals (not shown) are provided at the end of the backflush arm 14, which end is in contact with the annular element 10. The backflush arm 14 is connected to a pump 9 in order to aid the backflush over the filter chambers 13. A driving unit (not shown) is connected to the backflush arm 14 to rotatably drive the backflush arm 14 within the annular element 10, as indicated with arrow A. The driving unit and the pump 9 are connected to a controller (not shown), which controls the driving unit and the pump 9 on basis of predetermined parameters, such as time and/or pressure build up within the annular element 10. The main water flow, in use, flows from the inside of the annular element 10 to the outside of the annular element 10.

It is noted that it is possible that the flow of backflush water over the filter elements 12 chambers is provided on basis of the pressure in the housing 15 at the downstream side of the filter element 12 and that there is no pump 9 for aiding the flow of backflush water.

The first filter element 12 has filter openings with a largest dimension of less than 10 micron or 6 micron. Filter material with such small openings can be made from meshed wires, for instance from stainless steel wires material 316L or similar or from 304, Monel or other metal wires. Synthetic materials is also possible. The wires are very thin, and for the single woven meshed wires the smallest aperture width of the filter mesh is similar to the wire thickness. More complicated wire mesh is possible, such as Twill Dutch Weave, which makes smaller apertures possible. In other embodiments the filter material might consist of metal plates from the same materials as earlier mentioned, in which holes with a diameter of 6 or 10 micrometer are made, for instance using pulsed laser beams.

In the disclosed embodiment there are no filter openings with larger dimensions than 6 or 10 micrometers. Due to the fairly high pressure difference over the first filter element 12 and the structure of the organisms, filter elements with filter openings having a maximum opening of approximately 10 or 6 micron cause that the larger organisms are fragmented into smaller parts before passing the filter.

Figure 5B:
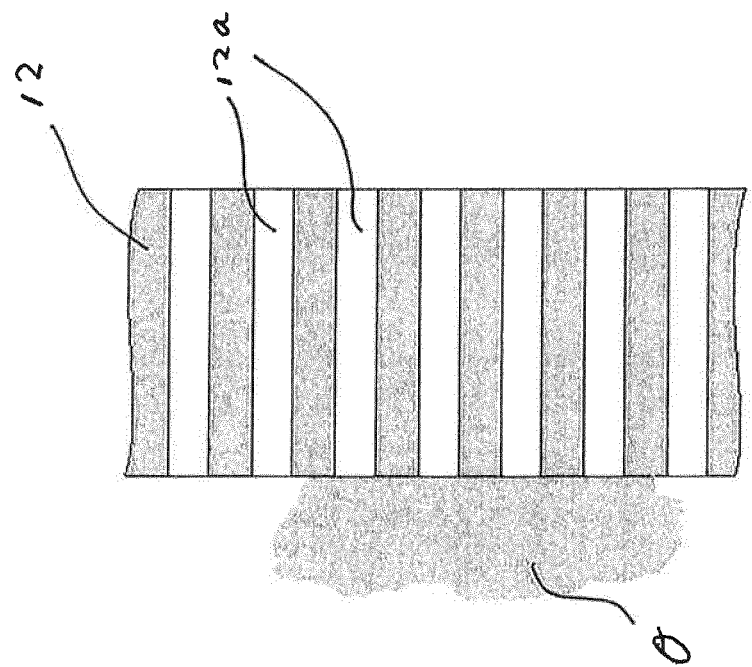
FIG. 5 is a schematic front view and cross section of the main filter.
Figure 5A:
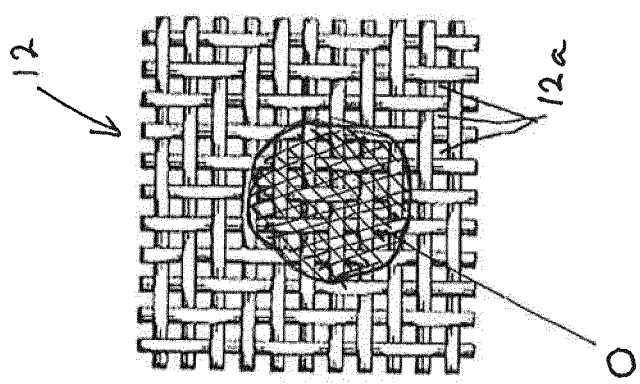

An organism that is larger than the filter opening will be fragmented and/or will be pulled into separate small pieces which can flow through the filter openings of the first filter element 12. FIG. 5 illustrates this process and shows an organism O on the first filter element 12, which is shown schematically in front view (FIG. 5a) on a wire mesh weave and in a cross section (FIG. 5b) on a metal plate with laser pulsed holes. On the upstream side an organism O lies against the filter element 12 and closes small filter openings 12a.

The pressure difference over the first filter element 12 presses on the organism O and fragments of the organism O will be pressed through the small filter openings 12a. The organism O shall disintegrate and shall flow in small pieces through the openings 12a. Hard parts in an organism may remain on the pressure side of the filter element 12 and will be removed by backflushing. The main filter 3 is designed such that the pressure difference over the first filter element 12 is higher than 0.1 bar (10 kPa) or might be higher than 0.2 bar (20 kPa). This pressure difference is sufficient to fragment the organisms O.

During operation, the pressure in the annular chamber 10 is approximately 2 bar (200 kPa) and a pressure difference of the main flow over the first filter element 12 is limited to 0.3 bar (30 kPa). Pressure sensors (not shown) are provided for measuring the pressure, which pressure sensors send a signal to the controller when the pressure difference over the first filter element 12 exceeds 0.3 bar (30 kPa). The controller then starts the flow of backflush water in order to clean the first filter elements 12.

It is also possible that a flow sensor 16 is provided downstream to the main filter 8 for measuring the flow from the main filter 8. In an embodiment, the flow sensor 16 sends a signal to the controller in order to start the backflush, when the flow sensor 16 senses that the flow in the main treatment line 1 is below a predetermined limit.

The flow of backflush water has a pressure difference over the first filter element 12 of approximately 1.6 bar (160 kPa). The backflush water rinses silt consisting of removed organisms and other removed particles out of the filter chambers 13 one by one, which silt she main filter 8 has filtered out of the main flow. An outlet 17 of the backflush arm is connected to an inlet 18 of an secondary treatment line 19 (see FIG. 2) of the system for cleaning and sanitizing a water flow, which is described in relation to and is shown in detail in FIG. 2.

After the water in the main treatment line has passed the main filter 8, the water enters a sterilizing station, in this embodiment a first UV-station 20 to radiate the water with UV-radiation. The UV-radiation kills and/or stops growth of any remaining organisms in the water. In this embodiment, the first UV-station 20 comprises two UV-lamps 21 to radiate the water. In practice, a UV-lamp needs about 5 minutes to start up in order that the radiation is strong enough to kill organisms. It is therefore contemplated that always one UV-lamp is switched on, such that it is possible to start treating ballast water immediately. In practice, the UV-lamp can be burning at half the maximum strength. It is noted that a C.I.P. (Cleaning In Place) system (not shown) may be provided to clean the UV-lamps 21 or their housings.

The fragmented parts of organisms that flow through the first filter element 12 have been pressed through openings of 6 or 10 micrometer. Although they may have some length the UV radiation can penetrate easy into the fragmented organisms. The irradiation of these fragmented parts is very effective and the power requirement for killing the organisms is limited.

In this embodiment of the system, a cooling line 22, optionally with an air cooled water cooler, is provided parallel to the first UV-station. The cooling line 22 is connected to the main treatment line 1 upstream and downstream to the first UV-station 20, such that a loop is created. In the case that the water flow through the first UV-station 20 is minimal, water can be contained within the loop 22 and the water can be circulated through the cooling line 22 and the first UV-station 20 by means of, e.g., a pump 24, distributing the heat and thereby cooling the lighted UV-lamp.

Optionally, the water flow may be blocked before and after the first UV-station 20, such that it is possible to circulate water through the cooling line 22. The UV-lamp(s) radiating the water may cause the temperature of the water to increase, which may cause the water to expand. An expansion tank with a membrane (not shown) may be provided near and connected to the first UV-station 20, such that expansion of the water caused by the UV-lamp(s) 21 may be absorbed by the expansion tank (not shown).

In other embodiments, the first UV-station 20 might be replaced by other systems for sterilizing the water flow, such as systems for sterilization with ozone, chloride, or similar systems. The sterilizing system kills the remaining organisms or incapacitates the reproduction, so that no fertile or viable organisms remain.

In order to provide sufficient pressure within the main treatment line 1 and the housing 15 of the main filter 8, a pressure regulating member, such as a flow controlling valve 10 is provided downstream to the main filter 8. The flow control valve 10 may be provided with a pressure sensor sensing the pressure within the main treatment line 1. The flow control valve 10 is connected to the controller (not shown), such that the pressure in the main treatment line 1 can be adjusted continuously. The pressure is used to monitor the filtering of the main flow through the main filter 8 and to control the flow of backflush water to ensure it is strong enough to rinse out the filter chambers 13. In this embodiment the pressure regulating member is a flow control valve. The flow control valve may also stop the flow before the first UV-station.

Due to the flow control valve 10, a system is provided with an adjustable water flow through the main treatment line 1. In an embodiment, the system may be controlled automatically.

A flow control valve 54 can also be provided downstream to the backflush member 14 in order to control the flow through the backflush member 14.

In this embodiment, after the water has passed the first UV-station 20, there is a gooseneck 25. On top of the gooseneck an aeration valve 26 is provided de-aerate the main flow line so that during use the UV-station 20 remains filled with water to provide cooling of the UV lamps. One or more sample elements 29 are provided upstream to the gooseneck 25, which sample elements 29 are configured to sample the water. Thereafter, the water is discharged into the environmental water via an outlet 30.

Figure 2:
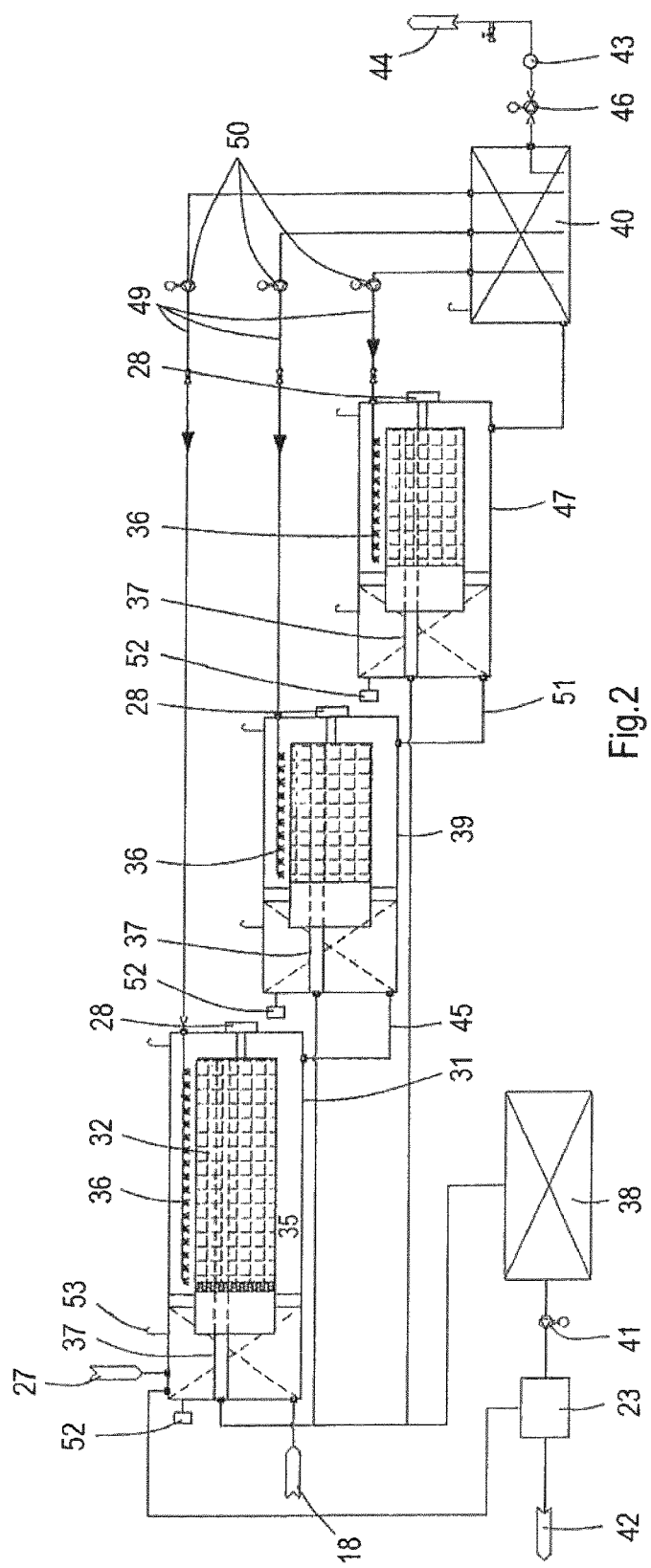
FIG. 2 is a schematic view of the secondary treatment line.

FIG. 2 shows the secondary treatment line 19 of the system for cleaning and sanitizing a water flow. The secondary treatment line 19 comprises an inlet 18 connected to the outlet 17 of the backflush member 14. The water from the backflush member 14 is collected. In the backflush filter 31, which is a rotary drum filter in this embodiment. An advantage of the rotary drum filter 31 is that little pressure difference is needed in order to filter the water, since the water flow is a gravitational flow through a large filter area. The backflush filter 31 might be called a gravitational filter as no pump pressure is used to press the water flow through the filter material, the filter material might be chosen from the material as described for the main filter.

Any air and spray from the self-priming unit 3 or other vent valve (s) may enter the rotary drum filter 31 through inlet 27, such that organisms particles in the air and spray are removed in the secondary treatment line 19 of the system and no organisms leave the system. The housing of the rotary drum filter 31 is provided with aeration openings 53 breathing air at low speed, so that no spray with organisms occur.

Figure 4:
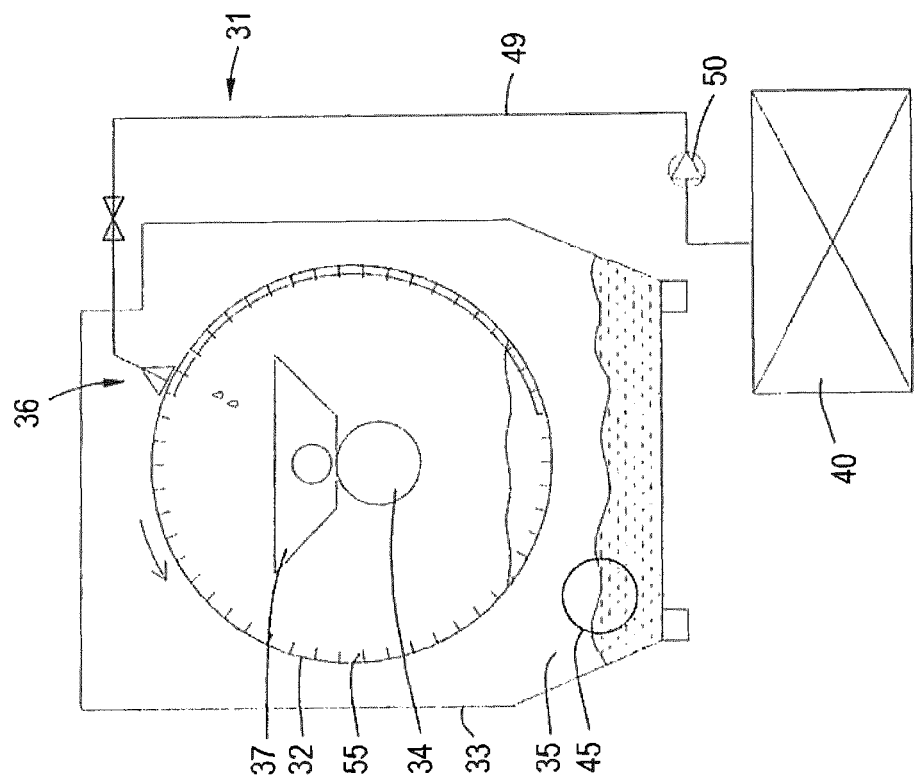
FIG. 4 is a schematic cross section of a rotary drum filter.

As shown in detail in FIG. 4, the first rotary drum filter 31 comprises a drum 32 within a container 33 and inside the drum 32 the water to be filtered. A drive 28 is provided, which drive 28 is connected to the controller (not shown). The controller controls the drive 28 to rotate the drum 32 of the rotating drum filter 31 continuously or intermittently. Water enters the rotary drum filter 31 at the inside via inlet 34 of the drum, which inlet 34 is in fluid communication to inlet 18, and thereafter flows through the drum elements with filter openings to the outside 35 of the drum 32, thereby passing a drum element that is part of the drum 32. The drum element has filter openings with a largest dimension of approximately 40 micron, 30 micron, 25 micron or 20 micron, which is sufficient to filter out in a gravitational flow, organisms that are larger than 50 micron. Also in this case, this means that there are no filter openings with larger dimensions.

In the first rotary drum filter 32 the pressure difference over the drum elements is limited to 0.05 bar (5 kPa) so that the larger organisms are not pressed through the filter mesh. This limited, pressure difference is called gravitational flow. In order to ensure this limited pressure difference in an embodiment the water level on the outside 35 of the drum 32 is above the underside of the drum 32. This limits the pressure difference over the drum elements to 5 kPa, 3 kPa or even to 1 kPa. An elbow pipe (not shown) with an opening extending upwards and connected to the outlet conduit 45 ensures this limitation in the pressure difference.

In an embodiment, inside the first rotary drum filter 31, a sensor (not shown) measures the water level, which sensor is connected to the controller. In the case that the sensor senses that the water level reaches a certain level, which is an indication that the filter openings are clogged by silt, which is the residue of the organisms filtered out by the drum elements, a signal is sent to the controller. The controller then sends a signal to a rinsing system, in this embodiment spray elements 36 to start spraying the outside surface of the drum 32. The spray elements 36 are located above a receiving station 37. The silt is sprayed from the drum elements, which silt falls into the receiving station 37. The receiving station 37 is connected to a silt tank 38 for collecting the silt from the rotary drum filter 31. It is noted that no light is able to enter the rotary drum filter 31 in order to prevent algae growth on the drum 32.

The drum of a rotary drum filter may comprise projections 55 intended for preventing the silt from moving downwards over the drum elements during rotating of the drum.

After the first rotary drum filter 31 has filtered the water, in the shown embodiment, the water enters an second backflush filter 39 via outlet conduit 45, in this case a second rotary drum filter 39, which is similar to and functions substantially the same as the first rotary drum filter 31. The drum of the second rotary drum filter 39 may have openings with a diameter of 50 micron, 45 micron, or 40 micron, 30 micron, 25 micron, or 20 micron. A water tank 40 is provided for collecting water leaving the additional rotary drum filter 39. The spray elements 36 of the first rotary drum filter 31 and the second rotary drum filter 39 are fed with water from the water tank 40 via conduit 49 and optionally pump 50. It is noted that no light is able to enter the water tank in order co prevent algae growth on the filter.

In this embodiment, a third rotary drum filter 47 is provided downstream to the second rotary drum filter 39. Via outlet conduit 51 the water filtered by the rotary drum filter 31 and the second rotary drum filter 39 enters the third rotary drum filter 47. In this case, the first rotary drum filter 31 serves as a pre-filter. Further, the rotary drum filter 31, the second rotary drum filter 39 and the third rotary drum filter 47 may have different sizes or may be able to filter different amounts of water. In the shown embodiment, there are three backflush filters. In some situations only one or two backflush filter(s) might be sufficient.

In case there is more than one backflush filter, the surface of the filter material and the openings in the filter material are designed such that during use the different filters remove the same amount of silt; this means that the openings in the filter material of a backflush filter will get smaller in direction of the flow.

The secondary line of the system for cleaning and sanitizing a water flow further comprises a separator 23, such as a centrifuge connected to the silt tank 38. A pump 41 pumps the silt from the silt tank 38 into the separator 40 and subsequently the separator separates water and sediment from the silt. The water from the separator 40 is recirculated to the flush tank 28. The sediment, which is a sludge with a water content of about 7-15%, or which might have a water content of less than 20% is routed to the outside of the system for cleaning and sanitizing a water flow via outlet 42 by mainly mechanical means, such as a displacement pump, after being stored in a storage area or a tank (not shown).

The water filtered by the backflush filters enters the main treatment line upstream to the first UV-station 20 via inlet. 44 such that water filtered in the secondary treatment line 19 is radiated during passing the first UV-station 20. Thereafter, the water is discharged into the environmental water. A pump 46, in this embodiment a centrifugal pump, is provided to pump the water from the water tank 40 to the first UV-station. Downstream to the pump 46, a flow meter 43 may be provided which may be connected to the controller (not shown)

Optionally, in an embodiment (not shown), the secondary treatment line is provided with a second UV-station comprising at least one UV lamp. The UV-lamp is provided downstream to the water tank 40, such that the filtered water of the secondary treatment line 19 can be irradiated with UV-radiation before the water is returned to the main treatment line 1 of the system for cleaning and sanitizing a water flow. Optionally, a valve may be provided downstream to the UV-lamp. Further, a recirculation line may be provided to recirculate water from a point downstream to the UV-lamp back to the water tank 40. In this manner, it is possible to cool the UV-lamp. In an embodiment (not shown), downstream to the water tank 40, the secondary treatment line may split into two lines. Each of the two lines may comprise a closing valve to close off the respective one of the two lines. In this way, it is controllable where the water from the secondary treatment line re-enters the main treatment line 1 via inlet 44 or an inlet downstream to the first UV-station 20.

A process shutdown valve 48 may be provided to stop the process of the system for cleaning and sanitizing a water flow in case of an emergency or failure. In this embodiment a butterfly valve is placed at the inlet 2 of the system, which valve is closable by air. The process shutdown valve is connected to the controller, such that the process shutdown valve is controllable on basis of all parameters which are determined during use of the system.

Optionally, in an embodiment where the system for cleaning and sanitizing a water flow is placed within a container (not shown), a water pump may be provided at the bottom of the container. The water pump may be in fluid communication with the backflush filter 31. In case a leakage occurs, the water can be pumped into the flush tank 28 such that no water with organisms leaks to the environment.

It is noted that all sealing and connections within the system for removing floating particles from a water flow are such that no particles or organisms can get stuck in for example a groove of the connection. The system further comprises different kinds of valves and connection points which are not discussed in detail, but are shown in the figures.

The device for cleaning and sanitizing a water flow is capable to treat a total maximum of 1000 m$^3$/h. for this capacity the first filter element may have a surface area of 8 m2 and the backflush filters may have a surface area of 3-6 m2.

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. Further, elements that are at least substantially identical or that perform an at least substantially identical function are denoted by the same numeral.

The invention is not restricted to the above-described embodiments, which can be varied in a number of ways within the scope of the claims. It is, for example possible device for cleaning and sanitizing a water flow comprises two main lines and two secondary lines for removing the organisms from a water flow. The device is then capable to treat a total maximum of 2000 m$^3$/h. Also two main treatment lines may be connected to one secondary line and/or two secondary treatment lines may be connected to one separator of centrifuge.

It is further possible that a monitoring panel is placed in a switchboard room with an interface for remote control of the valves and filters. The interface is connected to the controller as described above.

In a further embodiment, the system may be permanently mounted in a ship so that all ballast water of that ship is routed through the system when entering and/or leaving the ship.

The invention claimed is:

1. A system for cleaning and sterilizing a water flow, comprising:
    a main treatment line, comprising an inlet with a pump to pump water from a water storage through a main filter to a sterilizing station with one or more UV lamps to sterilize the water flow, and a system outlet,
    wherein the main filter is provided with a first filter element and a backflush member with a first backflush outlet to rinse the first filter element with backflush water,
    and a secondary treatment line, comprising an inlet being in fluid communication to the first backflush outlet, a backflush filter with a backflush filter element that has filter openings with a largest dimension between 50 micrometer and 20 micrometer to remove silt from the backflush water, and a secondary outlet being in fluid communication with the main treatment line, to lead filtered backflush water from the secondary treatment line to the main treatment line, wherein the backflush filter is designed such that a backflush pressure difference over the backflush filter element is less than 0.05 bar (5 kPa), and
    wherein the main filter is designed such that a pressure difference over the first filter element is at least 0.1 bar (10 kPa) or 0.2 bar (20 kPa); and
    wherein the largest dimension of openings in the first filter element are smaller than half of the largest dimension of the openings in the backflush filter element.

2. The system according to claim 1, wherein the backflush filter has a filter rinsing system to rinse the silt from the backflush filter element with rinsing water and the filter rinsing system is connected to a separator or centrifuge to remove rinsing water from the silt.

3. The system according to claim 1, wherein the first filter element comprises first filter openings with a largest dimension of 10 micron.

4. The system according to claim 1, wherein the backflush member is configured to rinse less than 20% of the openings in the first filter element simultaneously.

5. The system according to claim 1, wherein the secondary treatment line comprises two or more backflush filters in line.

6. The system according to claim 5, wherein a first backflush filter of the two or more backflush filters in line has filters openings with a largest dimension that is greater than or equal to a following backflush filter.

7. The system according to claim 1, wherein the backflush filter comprises a rotary drum filter.

8. The system according to claim 1, wherein the secondary outlet is connected to the main treatment line upstream relative to the sterilizing station or wherein the secondary treatment line has a second sterilizing station.

9. The system according to claim 1, wherein at least one of the UV-lamps in the sterilizing station is switched on continuously.

10. The system according to claim 1, wherein the backflush filter comprises a filter rinsing system to rinse the silt from the backflush filter element with rinsing water, wherein an outlet of the filter rinsing system is connected to a silt tank to collect the rinsing water with the silt rinsed from the backflush filter, wherein the silt tank is connected to a separator configured to dewater the silt, and wherein a first separator outlet is connected to the main treatment line or the secondary treatment line and a second separator outlet is connected to a storage area or to a storage tank to store the dewatered silt.

11. The system according to claim 1, wherein the main treatment line comprises a self-priming unit and/or a straining unit upstream with respect to the main filter.

12. The system according to claim 1, wherein the main treatment line comprises a pressure regulating element configured to regulate the pressure at the downstream side of the first filter element.

13. The system according to claim 1, wherein the system is placed in a container, on a vehicle or on a vessel.

14. The system according to claim 1, further comprising one or more vent valves upstream of the sterilizing station, wherein the vent valves are connected to a tank that drains upstream of the sterilizing station.

15. A method for cleaning and sterilizing a water flow, wherein the water flow is pumped through a first filter element of a main filter under a first pressure difference of at least 0.1 bar (10 kPa) or 0.2 bar (20 kPa);
wherein the first filter element can be rinsed with a flow of backflush water and organisms in the backflush water are filtered out as silt in a backflush filter with a backflush filter element that has filter openings with a largest dimension between 50 micrometer and 20 micrometer;
wherein when a backflush pressure difference over the backflush filter element is more than 0.05 bar (5 kPa), the backflush filter is cleaned with a water spray and the water spray with silt is dewatered in a separator and the dewatered silt is stored for later disposal;
wherein the water flowing from the main filter and the backflush filter is sterilized in a sterilizing station using UV radiation and guided to the environment, and the water flowing from the separator is re-entered into the water flow upstream of the main filter and/or the backflush filter; and
wherein the largest dimension of openings in the first filter element are smaller than half of the largest dimension of the openings in the backflush filter element.

16. The method according to claim 15, wherein the largest dimension of the openings in the first filter element are smaller than half of the largest dimension of the openings in the backflush filter element or are smaller than 10 micrometer.

17. The method according to claim 15, the method comprising:
measuring a first pressure difference over the first filter element, and
when the first pressure difference exceeds 0.3 bar (30 kPa), starting the flow of backflush water to rinse the first filter element.

18. The method according to claim 15, wherein the backflush filter is a rotary drum filter, the method further comprising:
measuring a water level within a drum of the rotary drum filter, and
when the water level reaches a predetermined level in the drum, activating a filter rinsing system to remove silt from an inside surface of the drum.

19. The system according to claim 5 wherein one of the backflush filters has openings with a largest dimension of 25 micron.

* * * * *